US005499299A

United States Patent [19]
Takenaka et al.

[11] Patent Number: 5,499,299
[45] Date of Patent: Mar. 12, 1996

[54] MODULAR ARITHMETIC OPERATION SYSTEM

[75] Inventors: Masahiko Takenaka; Naoya Torii; Takayuki Hasebe; Ryota Akiyama, all of Kawasaki, Japan

[73] Assignee: Fujitsu Limited, Kawasaki, Japan

[21] Appl. No.: 268,435

[22] Filed: Jun. 30, 1994

[30]     Foreign Application Priority Data

Jul. 2, 1993  [JP]  Japan .................................. 5-164870

[51] Int. Cl.$^6$ ............................. H04L 9/30; G06F 7/38
[52] U.S. Cl. ........................ 380/28; 380/30; 364/746; 364/756
[58] Field of Search ...................... 380/28, 30; 364/746, 364/756

[56]             References Cited

U.S. PATENT DOCUMENTS

| | | | |
|---|---|---|---|
| 3,980,874 | 9/1976 | Vora . | |
| 4,037,093 | 7/1977 | Gregg et al. | 364/746 |
| 4,658,094 | 4/1987 | Clark | 380/28 |
| 4,870,681 | 9/1989 | Sedlack | 380/30 |
| 4,949,293 | 8/1990 | Kawamura et al. | 364/746 |
| 4,994,994 | 2/1991 | Burgess et al. | 364/746 |
| 5,010,573 | 4/1991 | Musyck et al. | 380/28 |
| 5,121,431 | 6/1992 | Wiener | 380/30 X |
| 5,166,978 | 11/1992 | Quisquater | 380/30 |
| 5,274,707 | 12/1993 | Schlafly | 380/30 |
| 5,289,397 | 2/1994 | Clark et al. | 364/746 |
| 5,321,752 | 6/1994 | Iwamura et al. | 380/28 X |
| 5,349,551 | 9/1994 | Petro | 364/746 |
| 5,373,560 | 12/1994 | Schlafly | 380/30 |
| 5,414,651 | 5/1995 | Kessels | 364/746 |

FOREIGN PATENT DOCUMENTS

| | | |
|---|---|---|
| 60-34131 | 8/1985 | Japan . |
| 63-29784 | 2/1988 | Japan . |
| 63-50883 | 3/1988 | Japan . |
| 63-200183 | 8/1988 | Japan . |
| 63-200233 | 8/1988 | Japan . |
| 3-250314 | 11/1991 | Japan . |

OTHER PUBLICATIONS

"Modular Multiplication Without Trial Division", Montgomery, Mathematics of Computation, vol. 44, No. 170, Apr. 1985, pp. 519–521.

"An Algorithm for Modular Exponentiation", Willoner et al, 5th Symp. Comp. Arith., IEEE, pp. 135–138.

Primary Examiner—Gilberto Barrón, Jr.
Attorney, Agent, or Firm—Nikaido, Marmelstein, Murray & Oram

[57]             ABSTRACT

A modular arithmetic unit comprises an input register, a multiple computing section, an adder, and a correcting section. There is provided a multiple table in which multiples of a modulo N are stored to correspond with low-order some bits of an input number T in the input register. The low-order some bits of the input number T are used to look up its corresponding multiple of the modulo N in the multiple table. The adder adds the multiple of the modulo N retrieved from the multiple table and the contents of the input register. This addition is performed n times. The contents of the input register are updated with high-order predetermined bits of the sum in the adder each time addition is performed in the adder. The correcting section makes a correction on the result t of addition by the adder after n additions have been performed.

11 Claims, 8 Drawing Sheets

$AB \rightarrow ABR^{-1} \bmod N$     $R = b^n$     $b = 2^k$

MODULAR ARITHMETIC OPERATION SYSTEM

BACKGROUND OF THE INVENTION

1. Field of the Invention

The present invention relates to a modular arithmetic, or residue arithmetic, operation system suited for modular arithmetic used in the RSA encryption in a public key cryptosystem, for example, and more particularly, to a modular arithmetic unit which performs efficient residue arithmetic using the Montgomery's algorithm, a modular multiplication arithmetic unit which performs efficient modular multiplication using the residue arithmetic, and a table setup device for setting up a table of multiples for the modular arithmetic.

2. Description of the Related Art

The recent development of computer network systems has rapidly increased opportunities to send and receive digitized information and messages over networks, like database services, electronic mail service, electronic news services and the like. In addition, other information services, such as on-line shopping service, are now being made available. However, it is pointed out that problems arise in connection with these information services in that data on the network is subject to wiretapping, falsification, and illegal access. In wireless network systems employing radio communications in particular, messages are subject to interception and thus measures against this problem are demanded.

To address those problems, an encrypted electronic mail system using cryptography and a user authentication system have been proposed, which are now being introduced into various network systems. In this respect, encryption technology can be said to be one of technologies that are essential to computer network systems.

The encryption technology includes a public key cryptosystem suitable for digital signature, i.e., user authentication. The public key cryptosystem involves a great amount of computation for encryption and decryption. Thus, a high-speed public key cryptosystem is desired. So far, various efficient algorithms have been announced.

The cryptosystems can be roughly classified into two: secret key cryptosystem and public key cryptosystem.

In the secret key cryptosystem, the sender and the recipient use the same encryption key for encrypted communications. That is, in the secret key cryptosystem, the sender enciphers a message (plaintext) using the secret encryption key and the recipient deciphers the encrypted message (ciphertext) using the same encryption key to obtain the original message.

In the public key cryptosystem, on the other hand, the sender enciphers a message using the recipient's encryption key that is made public and the recipient deciphers the encrypted message from the sender using his secret decryption key. That is, in the public key cryptosystem, the public key is used for encryption and the secret key is used for deciphering the message encrypted using the public key. Only the secret key is allowed to decipher a message encrypted by the public key.

In the secret key cryptosystem, each subscriber or user has to hold as many secret keys as there are subscribers with whom he or she communicates. A network having n subscribers would require a total of n(n−1)/2 keys. A problem arises in connection with this system in that each subscriber has to deliver a secret key to a separate subscriber with whom he or she communicates for the first time. To remedy this problem, an approach taken by a large-scale network system is such that there is installed a key management center which holds only secret keys each used for communications between the center and respective individual subscribers, and for communication with a subscriber a sender gets from the center a secret key for the recipient. In this case, the total number of secret keys would be n.

In the public key cryptosystem, on the other hand, each subscriber has to hold only his or her own secret key. The total number of secret keys required is n in the case of an n-subscriber network system. A sender has only to deliver his or her public key to a recipient with whom the sender communicates for the first time. Specifically, there is installed a key management center equipped with a public directory into which n users' public keys are entered. For communication each sender has only to get the public key of a recipient from the center. In this case, the center has only to prevent the public keys from being falsified and does not have to hold the keys in secret. The public key system needs a larger number of bits for each key than the secret key system. Thus, the size of a file for storing the keys increases.

For authentication, in the secret key cryptosystem, the sender compresses a message with the secret key. It is sent combined with that message. The recipient likewise compresses for comparison. However, since the sender and the recipient use the same key, the recipient will be able to forge authentication data.

In contrast, the public key cryptosystem has a feature that it is only the person in question that is allowed to encrypt a message using the secret key. The sender compresses a message and then encrypts it using the secret key. The compressed and encrypted message is sent combined with that message. The recipient deciphers the combined data using the public key of the sender and then compresses it for comparison. In this case, the recipient will not be able to commit an injustice.

Thus, the public key cryptographic technique can be said to be essential to the authentication. However, the public key cryptosystem has a major drawback that it requires a great amount of calculation for encryption and decryption. Therefore, both of the systems are often used in combination. That is, in general, the fast secret key cryptosystem is used for encrypting messages and the public key cryptosystem is used for authentication.

Of most importance among the public key systems is the RSA encryption technique using the RSA algorithm that was devised by Rivest, Shamir and Adlman in 1977. The basic principle of the RSA encryption is as follows.

<RSA basic algorithm>

In an encryption key (e, N) and the corresponding decryption key (d, N), e and N are public keys and d a secret key. Let M be an original message or plaintext and C be a ciphertext. Then, the algorithms for encryption E and decryption D are represented by $C = E(M) = M^e \bmod N$ $M = D(C) = C^d \bmod N$ where $d \cdot e = 1 \bmod \text{LCM} \{(p-1), (q-1)\}$ $N = p \cdot q$ LCM = lowest common multiple p, q = large prime numbers Normally, each of e, d, N and M is a large integer consisting of about 512 bits. Even using fast modular exponentiation, modular multiplication and modular arithmetic must be performed, on average, 770 times in an RSA operation. For modular arithmetic in particular, many efficient arithmetic techniques, such as an approximation technique, a residue table technique, the Montgomery's algorithm, etc., have been proposed.

In order to efficiently process an algorithm for modular exponentiation that is most commonly used in the public key cryptosystems represented by the RSA cryptosystem, it is required to speed up modular arithmetic in an RSA operation.

The Montgomery's algorithm ("Modular Multiplication Without Trial Division", Peter L. Montgomery, Mathematics of Computation, Volume 44, Number 170, April 1985 pp. 519 to 528), which is an technique to speed up modular arithmetic, will be described below.

<Montgomery's algorithm>

The Montgomery's algorithm is an algorithm which allows modular arithmetic without division by modulo N by using that, by the use of modulo N (N>1) and a radix R (R>N) that is coprime to N, computation of $TR^{-1}$ mod N from T is performed only by division by R. Here, N, N', R, $R^{-1}$ are each an integer. T is $0 \leq T < RN$. $R^{-1}$ is the reciprocal of the radix R, modulo N ($RR^{-1}$ mod N=1), satisfying $RR^{-1} - NN' = 1$ ($0 \leq R^{-1} < N$, $0 \leq N' < R$).

When the radix R is selected to be a power of 2, the division by R can be replaced by simple shift operations, permitting high-speed computation $T \rightarrow TR^{-1}$ mod N.

Next, algorithm REDC(T) for $T \rightarrow TR^{-1}$ mod N is indicated as "Algorithm 1". In "Algorithm 1", (T+mN)/R is divisible exactly.

<Algorithm 1>

The algorithm REDC(T) for $T \rightarrow TR^{-1}$ mod N is represented as follows:

m=(T mod R)N' mod R t=(T+mN)/R if t<N then return t else return t−N

That is, $$REDC(T) = t (t < N)$$
$$= t - N (t \geq N)$$

In a single REDC operation, $TR^{-1}$ mod N is merely obtained, not T mod N. In order to obtain T mod N, it is thus required to perform an REDC operation again using the product of REDC(T) and $R^2$ mod N obtained in advance as follows:

$$REDC(REDC(T) * (R^2 \bmod N)) =$$

$$(TR^{-1} \bmod N)(R^2 \bmod N) R^{-1} \bmod N =$$

$$TR^{-1} * R^2 * R^{-1} \bmod N = T \bmod N$$

In this way, T mod N can be obtained.

<Extension of REDC to multiprecision arithmetic>

Next, the REDC arithmetic algorithm is extended to multiprecision arithmetic where the modulo N or the radix R is multilength, i.e., multiprecision.

When the modulo N or the radix R is multiprecision, computations of (T mod R)N' and mN in the REDC arithmetic involve processing of multiprecision×multiprecision, which requires of a general-purpose computer a very great amount of computation and a very large amount of processing time. "Algorithm 2" is then shown below which allows this part of arithmetic to be performed by processing of multiprecision×single-precision.

<Algorithm 2>

The algorithm which permits an extension of the REDC arithmetic to multiprecision is shown as follows.

Assume that T is a base b number and $T=(T_{2n-1} T_{2n-2} \ldots T_0)_b$, $R=b^n$, $b=2^k$. When the following arithmetic is performed repeatedly for i=0 to n−1, $TR^{-1}$ mod N can be obtained in the same manner as the single-length, i.e., single-precision arithmetic.

for i=0 to n−1 m'=$T_0$N' mod b

T=T+m'N t=T/b next which involves the use of mutual division of extended Euclid's algorithm, requires a larger amount of time than $R^2$ mod N to process.

SUMMARY OF THE INVENTION

It is therefore an object of the present invention to provide a modular arithmetic unit which permits modular arithmetic to be performed at high speed by simplifying calculations of multiples which involve reiterative arithmetic operations.

It is another object of the present invention to provide a modular multiplication arithmetic unit which permits modular multiplication arithmetic to be performed at high speed by simplifying calculations of multiples which involve reiterative arithmetic operations.

It is still another object of the present invention to provide a table setup device which permits a table of multiples for use in the modular arithmetic unit and the modular multiplication arithmetic unit of the present invention to be set up easily.

An modular arithmetic unit of the present invention uses a lookup table in a multiple computing section which otherwise involves repeated computations so as to obtain results of computations by means of table lookup. This allows modular arithmetic to be performed quickly.

That is, the modular arithmetic unit of the present invention comprises an input register, a multiple if t<N then return t else return t−N By performing the REDC arithmetic again using the product of $TR^-$mod N thus obtained and $R^2$ mod N obtained in advance as described previously, T mod N can be obtained.

If, in the above-described Montgomery's algorithm, the radix R is set to a power of 2, then lengthy division computations can be replaced with high-speed shift operations, allowing the modular arithmetic to be performed at high speed.

Nevertheless, for the multiprecision processing, the high-speed arithmetic using the Montgomery's algorithm involves multiplications of multiprecision×single-precision, so that a great amount of computation is still required.

If arithmetic, such as modular exponentiation, is performed using the Montgomery's algorithm, modular arithmetic will be repeated many times. It will therefore be desirable to reduce a total amount of computation and improve processing speed by, for example, simplifying part of arithmetic that needs a large number of modular arithmetic operations as much as possible.

In addition, the Montgomery's algorithm needs preprocessing of computing parameters, such as N' and $R^2$ mod N, which are unique to the Montgomery's method and have to be computed in advance. In particular, N', computing section, an adder, and a correcting section.

The input register holds an input number T subjected to modular arithmetic. The multiple computing section has a multiple table in which multiples of a modulo N are stored to correspond with the low-order some bits of the number T in the input register. The multiple computing section uses the low-order some bits of the number T in the input register to look up its corresponding multiple in the multiple table, so that that multiple is retrieved from the table. The adder adds the multiple of the modulo N obtained by the multiple computing section and the contents of the input register. This addition is performed n times. The high-order predetermined bits of the result of addition in the adder are used to update the contents of the input register for each addition. The correcting section makes a correction on t obtained as the result of n additions by the adder.

The modular arithmetic unit can use the multiple table in the multiple computing section, which otherwise requires computations to be repeated n times, to obtain multiples of the modulus quickly. For this reason, the modular arithmetic can be performed at high speed.

To be specific, in the modular arithmetic unit, the input number T in the Montgomery's algorithm described previously are entered into the input register, and multiples m'N of the modulo N (where m'=(T mod b)N' mod b, N'=integer, R (integer)=$b^n$, b=$2^k$) are stored in the multiple table. By table lookup, a multiple m'N of the modulo N corresponding to the low-order k bits of the input number T can be obtained quickly. The multiple m'N and the input number T are added together in the adder. The result of this addition is used to update the contents of the input register. This processing is repeated n times, so that the adder outputs t=(T+mN)/R. The output t of the adder is corrected by the correcting section such that if t<N, t=REDC(T) is output as it is, or if t≧N, t−N=REDC(T) is output as $TR^{-1}$ mod N.

A table setup device of the present invention for setting up the above multiple table comprises a repeated addition section, a complement computing section, and a table writing section. The repeated addition section adds the modulo N to itself repeatedly. The complement computing section obtains the two's complement of the low-order k bits of each sum obtained by the repeated addition section. The table writing section writes each sum obtained by the repeated addition section into the table address indicated by the two's complement for that sum. This table setup device may be implemented by a computer that performs the same functions with software.

Thanks to this table setup device, a table of multiples can be set up on storage without the need of obtaining N' that otherwise would require an appreciable amount of time to compute.

Instead of providing the multiple computing section using the multiple table, another type of multiple computing section may be provided which comprises a multiple information computing section, a modulo register, and a multiplier. The multiple information computing section uses a multiple information table in which multiple information m' is stored to correspond with the low-order some bits of the input number T. The multiple information table is referred to by the low-order some bits of T, so that the corresponding multiple information is retrieved from the table. The modulo register holds the modulo N. The multiplier multiplies the multiple information m' retrieved from the table and the modulo N in the modulo register.

In this case, a multiple m'N of the modulo N corresponding to the low-order some bits of T is obtained by the multiple computing section. Although the speed of computation of this system is slower than that of the above-described multiple-table-based system, the multiple information table requires less storage capacity than that multiple table.

In a modular multiplication arithmetic unit according to the present invention, a split multiplication section is added to the modular arithmetic unit described above. In this split multiplication section, each of blocks, into which a multiplicand is split in units of a predetermined number of bits, is multiplied by a multiplier sequentially. The modular multiplication arithmetic unit applies an output of the split multiplication section to the input register of the above-described modular arithmetic unit. The output of the adder in the modular arithmetic unit is added to the result of multiplication by the split multiplication section, thereby performing modular multiplication arithmetic.

When the modular arithmetic unit or the modular multiplication unit of the present invention is implemented by software, assume that the processing time of the modular arithmetic part of a system which does not use any table corresponds to 100. Then, the multiple-information-table-based system corresponds to 98, while the multiple-table-based system corresponds to 31. It is therefore evident that speeding up the processing can be attained.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

<Principle of the Present Invention>

The principle of the modular arithmetic of the present invention will be described in detail prior to the description of the preferred embodiments of a modular arithmetic unit of the present invention.

Figure 1:
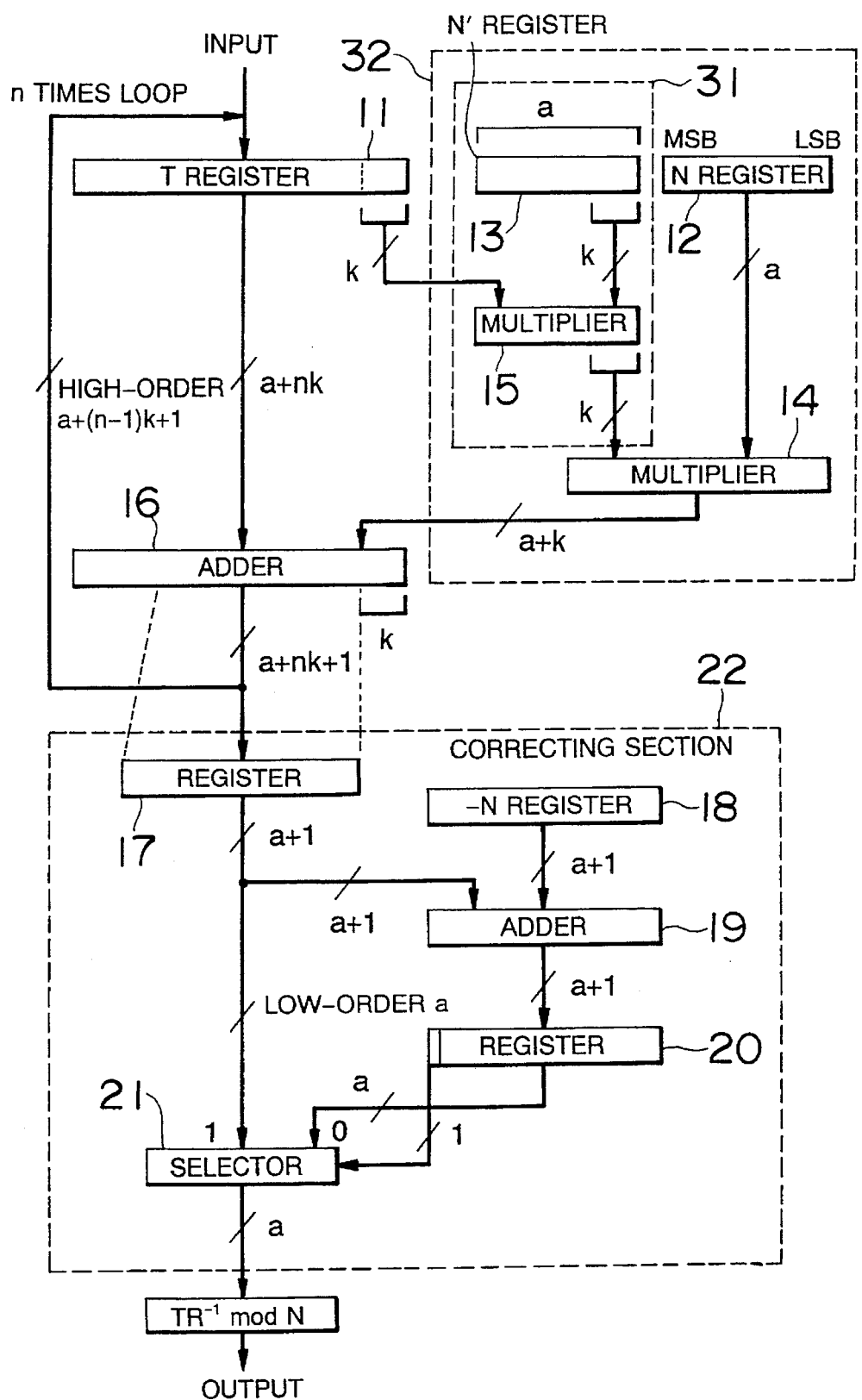
FIG. 1 is a block diagram of a general example of a hardware implementation of the Montgomery's algorithm.

In general, a modular arithmetic unit based on the above-described Montgomery's algorithm will be implemented with hardware as shown in FIG. 1. Note that, in this figure, the above-described multiprecision algorithm is implemented with hardware as it is.

The modular arithmetic unit of FIG. 1 performs a process of T→$TR^-$ mod N with R=$b^n$ and b=$2^k$ as described previously. The modular arithmetic unit of FIG. 1 comprises a T register 11, an N register 12, an N' register 13, a first multiplier 14, a second multiplier 15, a first adder 16, a first register 17, a −N register 18, a second adder 19, a second register 20, and a selector 21.

The first register 17, the −N register 18, the second adder 19, the second register 20 and the selector 21 forms a correcting section 22. The N' register 13 and the second multiplier 15 constitutes a section 31 for computing information on multiples. The multiple information computing section 31, the N register 12 and the first multiplier 14 constitutes a section 32 for computing multiples.

For description of the modular arithmetic unit suppose here that the modulo N consists of a bits and an input value consists of a+nk bits.

The T register 11 corresponds to an input register, which holds an input value T. The N and N' registers 12 and 13 are a-bit registers which hold the modulo N and N', respectively. The second multiplier 15 multiplies the low-order k bits of T in the T register 11 and the low-order k bits of N' in the N' register 13 and stores the resulting product in it. The first multiplier 14 multiplies N in the N register 12 and the low-order k bits of the product in the second multiplier 15.

The first adder 16 adds the value (a+nk bits) in the T register 11 and the value (a+k bits) in the first multiplier 14 and holds the result in it. The high-order (a+(n−1)k+1) bits of the sum (a+nk+1 bits) in the first adder 16 are looped back to the T register 11 to update its contents. This loopback is performed n times.

The first register 17 holds the low-order a+1 bits to the left of the rightmost k bits of the sum in the first adder 16. The −N register 18 holds the value (a+1 bits) of −N, which is opposite in sign to the modulo N that is given in advance. The second adder 19 adds the value in the first register 17 and the value in the −N register 18 and places the result in the second register 20. The selector 21 responds to the value of the first (leftmost) one bit (corresponding to a sign bit) of the (a+1)-bit value in the second register 20. That is, the selector 21 outputs the value in the first register 17 when that sign bit is one or the value in the second register 20 when the sign bit is zero.

For modular arithmetic, N, N', and −N, which have been computed in advance by preprocessing, are placed in the N register, N' register, and −N register, respectively.

The input number T is first placed in the T register 11. The low-order k bits of the value in the T register 11 and the low-order k bits of the value in the N' register 13 are entered into the second multiplier 15 and multiplied therein. The low-order k bits of the result of the multiplication and the value in the N register 12 are multiplied in the first multiplier 14. The result of this multiplication in the first multiplier 14 and the value in the T register 11 are added together in the first adder 16. When the number of times the output of the first adder 16 has been looped back to the input of the T register 11 is less than n, the high-order a+(n−1)k+1 bits of the sum in the first adder 16 is entered again into the T register 11. When the loopback is performed n times, a+1 bits from the low-order (k+1)st bit to the low-order (a+k+1)st bit in the sum in the first adder 16 are taken out and entered into the first register 17 in the correcting section 22.

In the correcting unit 22, the input is held temporarily in the first register 17. The value in the first register 17 and the value in the −N register 18 are added together in the second adder 19. The resulting sum is placed in the second register 20. The high-order one bit of the second register 20 is applied to the selector 21, whereby it determines which input to select. When that bit is one, the selector 21 selects the value in the first register 17. Otherwise, the selector 21 selects the value in the second register 20. The value selected by the selector 21 is output as the result of arithmetic.

Note here that the process performed by the correcting section 22 is to subtract N from the calculated value t (calculated T mod N) when t is equal to or larger than N at the final stage of the Montgomery's algorithm described above.

With the arrangement as shown in FIG. 1, the same process will be repeated many times in the multiple computing section 32. When this arrangement is used for modular exponentiation, the entire process will be repeated over and over, resulting in a significant increase in the number of processes to be performed in the multiple computing section 32.

On the other hand, the multiple computing section 32 requires an appreciable amount of processing time in addition to a very large number of processes because it mainly performs arithmetic operation of multiplication that involves a very large amount of computation and moreover the computation required is to obtain the product of a multi-precision value of N and a k-bit variable.

A modular arithmetic unit according to a first embodiment of the present invention uses a multiple information table for that part corresponding to the multiple computing section 32 in FIG. 1, thereby simplifying and speeding up computation processing.

<Embodiment 1>

Figure 2:
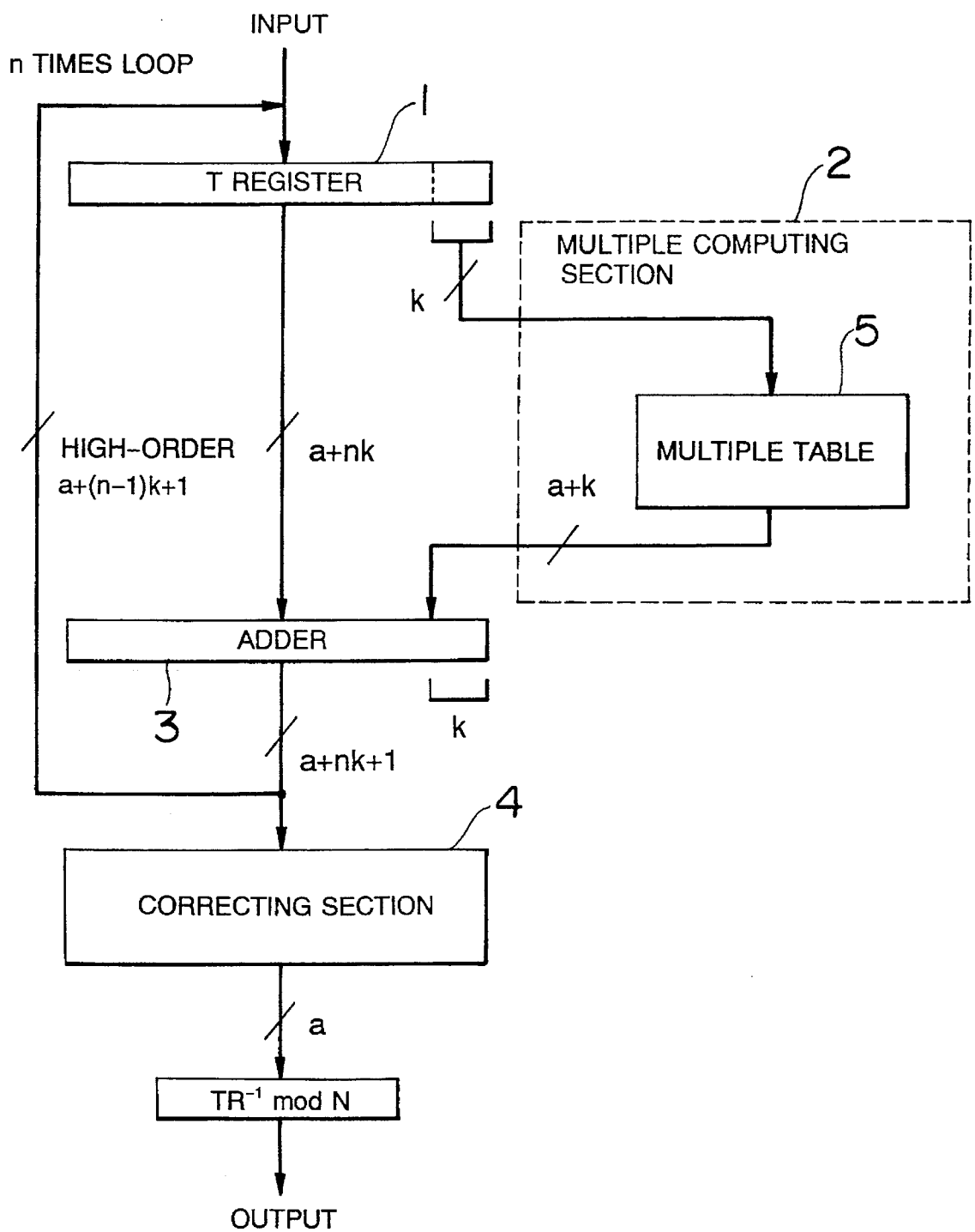
FIG. 2 is a block diagram of a modular arithmetic unit according to a first embodiment of the present invention.

FIG. 2 is a block diagram of a modular arithmetic unit according to a first embodiment of the present invention.

The modular arithmetic unit of FIG. 2 comprises an input register 1, a multiple computing section 2, an adder 3, and a correcting section 4.

The input register 1 holds an input number T subjected to modular arithmetic. The multiple computing section 2 has a multiple table 5 which stores multiples of modulo N corresponding to the low-order k bits of the input register 1. The low-order k bits of T in the input register 1 are used to look up a multiple of modulo N corresponding to the low-order k bits in the multiple table 5. The adder 3 adds the multiple of modulo N obtained by the multiple computing section 2 and the contents of the input register 1. The addition in the adder 3 is performed a predetermined number of times, n. The contents of the input register 1 are updated by the high-order a+(n−1)k+1 bits of the sum in the adder 3 whenever addition is performed. The correcting unit 4 makes corrections on t that is obtained as the final sum in the adder 3.

Such a modular arithmetic unit as described above is allowed to obtain multiples quickly by the use of the multiple table 5 in the multiple computing section 2 which otherwise needs to repeat computations n times, allowing fast modular arithmetic to be performed.

To be specific, in the modular arithmetic unit of FIG. 2, the number for modular arithmetic, T, in the Montgomery's algorithm described previously is stored in the input register 1, and multiples m'N of modulo N corresponding to the low-order k bits of T are retrieved from the multiple table 5 in which the multiples m'N of modulo N (where m' =(T mod b)N' mod b; N', R=integer R=$b^n$, b=$2^k$) are stored. The multiple m!N and the number T are added together, and the sum is used to update the contents of the input register 1. Such processing is repeated n times, so that t=(T+mN)/R is obtained at the output of the adder 3. The output t of the adder 3 is applied to the correcting section 4, which outputs, as $TR^{-1}$ mod N, t=REDC(T) if t<N or t−N=REDC(T) if t≧N.

The modular arithmetic unit of the present invention uses table lookup based on low-order bits of a value held in the input register in the multiple computing section 2 which otherwise requires many repeated computations based on loop, thereby allowing fast modular arithmetic. Particularly, if the multiple table 5 is used in the multiple computing section 2 so as to perform all the functions of the multiple computing section 2 with table lookup, then the processing speed will be improved significantly.

A modular arithmetic unit according to a second embodiment of the present invention replaces the multiple information computing section 31 in FIG. 1 with a multiple information table of a size of k bits×$2^k$, thereby avoiding time-consuming computations and speeding up processing.

The following embodiments will be described on the assumption that the number of bits is selected such that a=512, k=8, and n=64 only for convenience of description.

<Embodiment 2>

Figure 3:
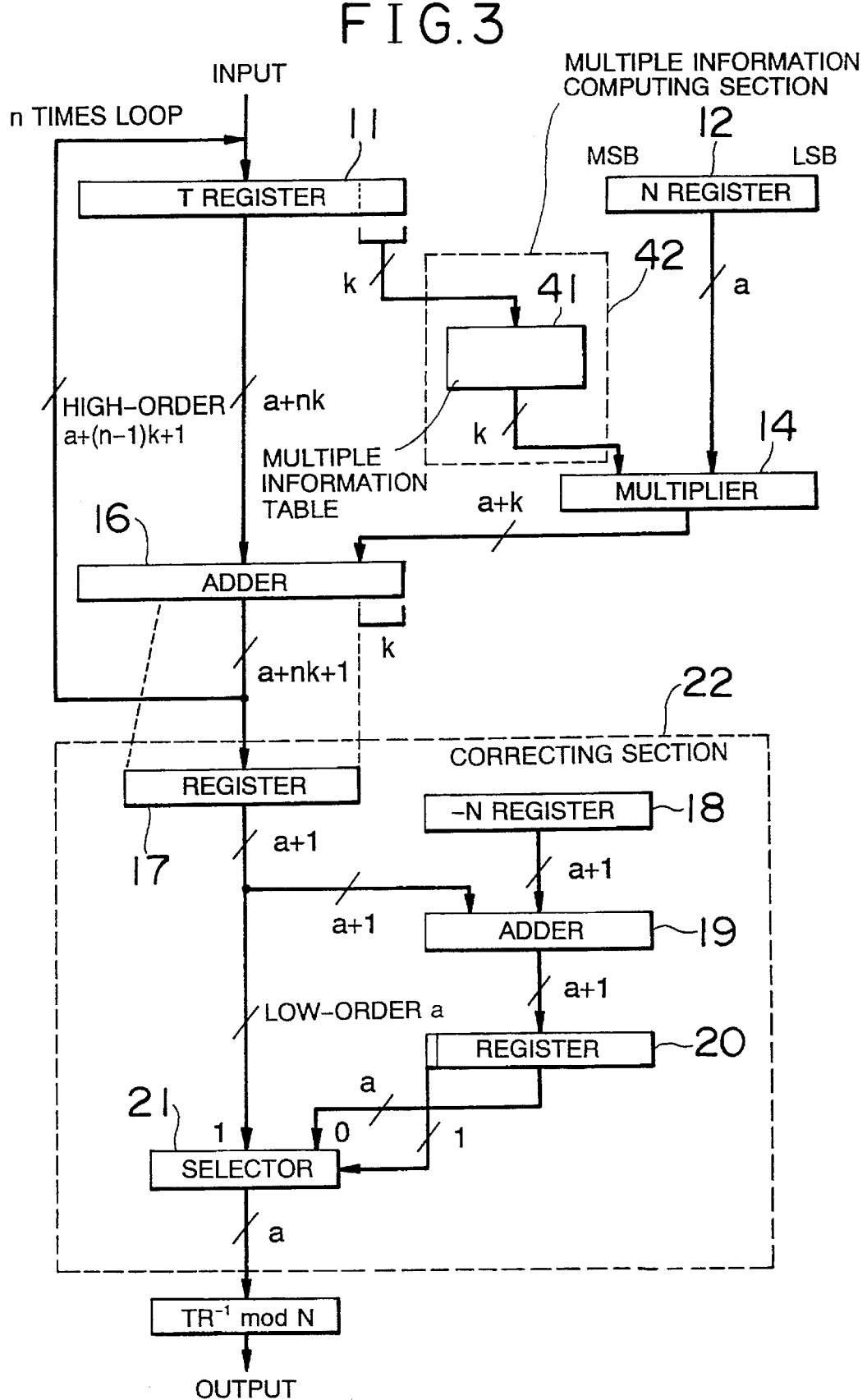
FIG. 3 is a block diagram of a modular arithmetic unit according to a second embodiment of the present invention.

FIG. 3 is a block diagram of a multiple-information-table-based modular arithmetic unit according to the second embodiment of the present invention. In this figure, like reference numerals are used to denote corresponding parts to those in FIG. 1. The modular arithmetic unit of FIG. 3, like the arithmetic unit of FIG. 1, comprises T register 11, N register 12, first multiplier 14, first adder 16 and correcting section 22. The correcting section 22 comprises first register 17, –N register 18, second adder 19, second register 20, and selector 21.

Further, the modular arithmetic unit of FIG. 3 is provided with a multiple information computing section 42 having a multiple information table 41 that is a replacement for the multiple information computing section 31 of FIG. 1.

The multiple information table 41 stores multiple information m' for low-order some bits of an input number T.

The T register 11 is a 1024-bit input register that is loaded with T. To the register 11 is also re-entered an output of the first adder 16 via a feedback loop. The multiple information table 41 is 8 bits in width and 256 entries in depth. The low-order 8 bits of the T register 11 are used for table lookup, so that a piece of 8-bit multiple information m' is output from the table. The N register 12 is a 512-bit register adapted to hold the modulo N.

The first multiplier 14 multiplies an 8-bit entry retrieved from the table 41 and the 512-bit modulo N from the register 12. The first adder 16, which is a 1025-bit adder, adds the value in the T register 11 and the result of multiplication by the first multiplier 14. The correcting section 22 is arranged substantially identically to the correcting section of FIG. 1 to make a correction on the result of the modular arithmetic.

Figure 4:
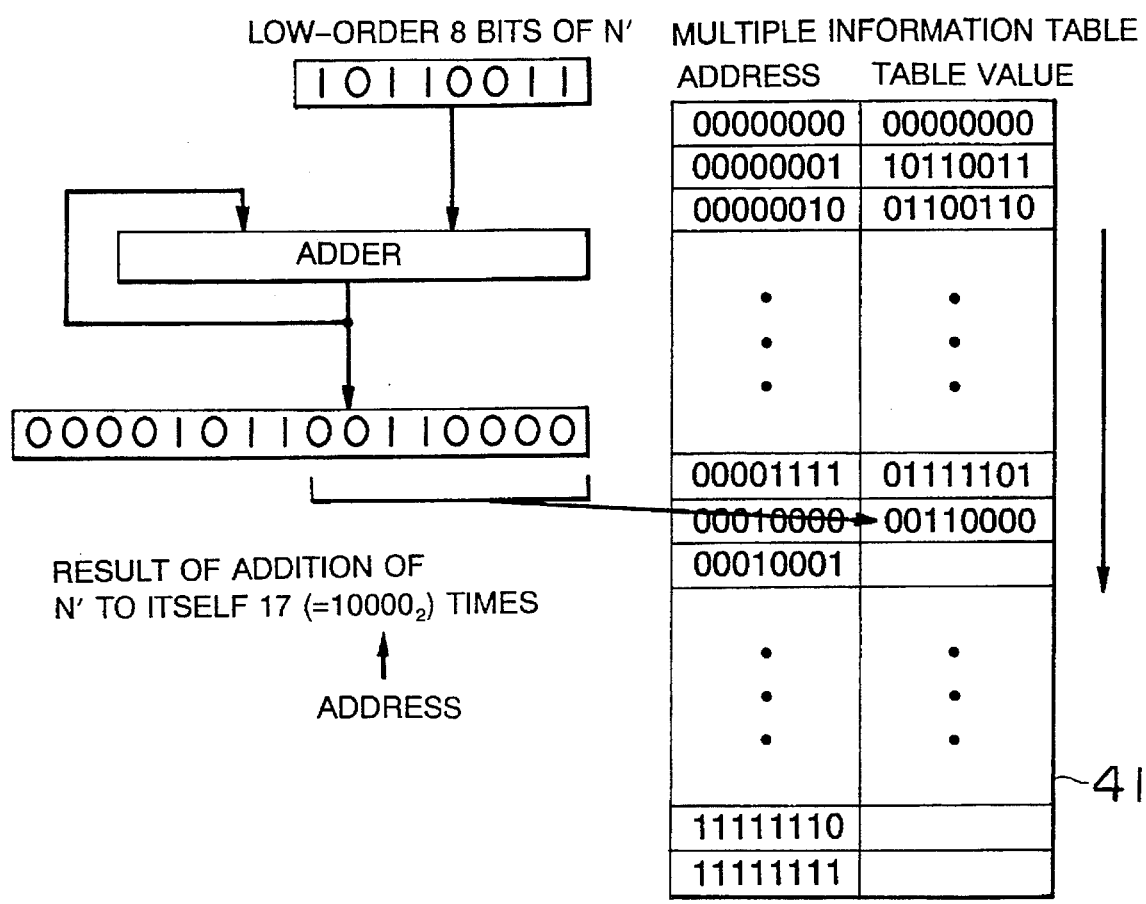
FIG. 4 is a diagram for use in explanation of the multiple information table used in the modular arithmetic unit of FIG. 3.

The multiple information table 41 of the multiple information computing section 42 is set up such that, as shown in FIG. 4, a number represented by the low-order 8 bits of N' is added to itself 255 times and the result (containing only low-order 8 bits) of each sum is placed sequentially in column. That is, the number of times of addition is used as the address of multiple information.

When T is entered into the T register 11, the multiple information table 41 is referred to by its low-order 8 bits. The multiple information (=m') retrieved from the table and the value N in the N register 12 are multiplied by the first multiplier 14. The result of multiplication by the first multiplier 14 and the value in the T register 11 are added together in the first adder 16. When the number of times, n, the loopback for addition has been performed so far is less than 64, the high-order 1018 bits of the sum in the first adder 16 is re-entered into the 1024-bit T register 11 with the least significant bit (LSB) of the 1018 bits from the adder 16 entered into the LSB of the T register 11. When n=64, 513 successive bits of the sum in the first adder 16 beginning with its low-order ninth bit are entered into the first register 17 in the correcting section 22. The correcting process in the correcting section 22 is the same as that in FIG. 1.

In this way, the modular arithmetic unit of FIG. 3 obtains multiple information on the basis of table lookup in the multiple information computing section 42, allowing multiple information to be obtained quickly and fast modular arithmetic.

Note that a table version of the multiple information computing section 32 in FIG. 1 as in FIG. 2 is, of course, more useful in speeding up the processing than a table version of the multiple information computing section 31 in FIG. 1. However, it is inevitable that the table size will increase. If there is no room for a large table in storage, even a small-scale device could attain an increase in processing speed by a table version of the multiple information computing section 31.

Next, a multiple-table-based modular arithmetic unit in which the multiple computing section 32 of FIG. 1 is formed into a table will be described.

A modular arithmetic unit according to a third embodiment of the present invention, which uses a multiple table like the first embodiment of FIG. 2, is a more specific modular arithmetic unit that has the multiple computing section 32 in FIG. 1 in the form of a multiple table having a size of a+k bits×$2^k$, thereby avoiding lengthy computations and speeding up processing.

<Embodiment 3>

The third embodiment of the present invention will be described with reference to FIG. 5 in which like reference numerals are used to denote corresponding parts to those in FIG. 3 or FIG. 1.

Figure 5:
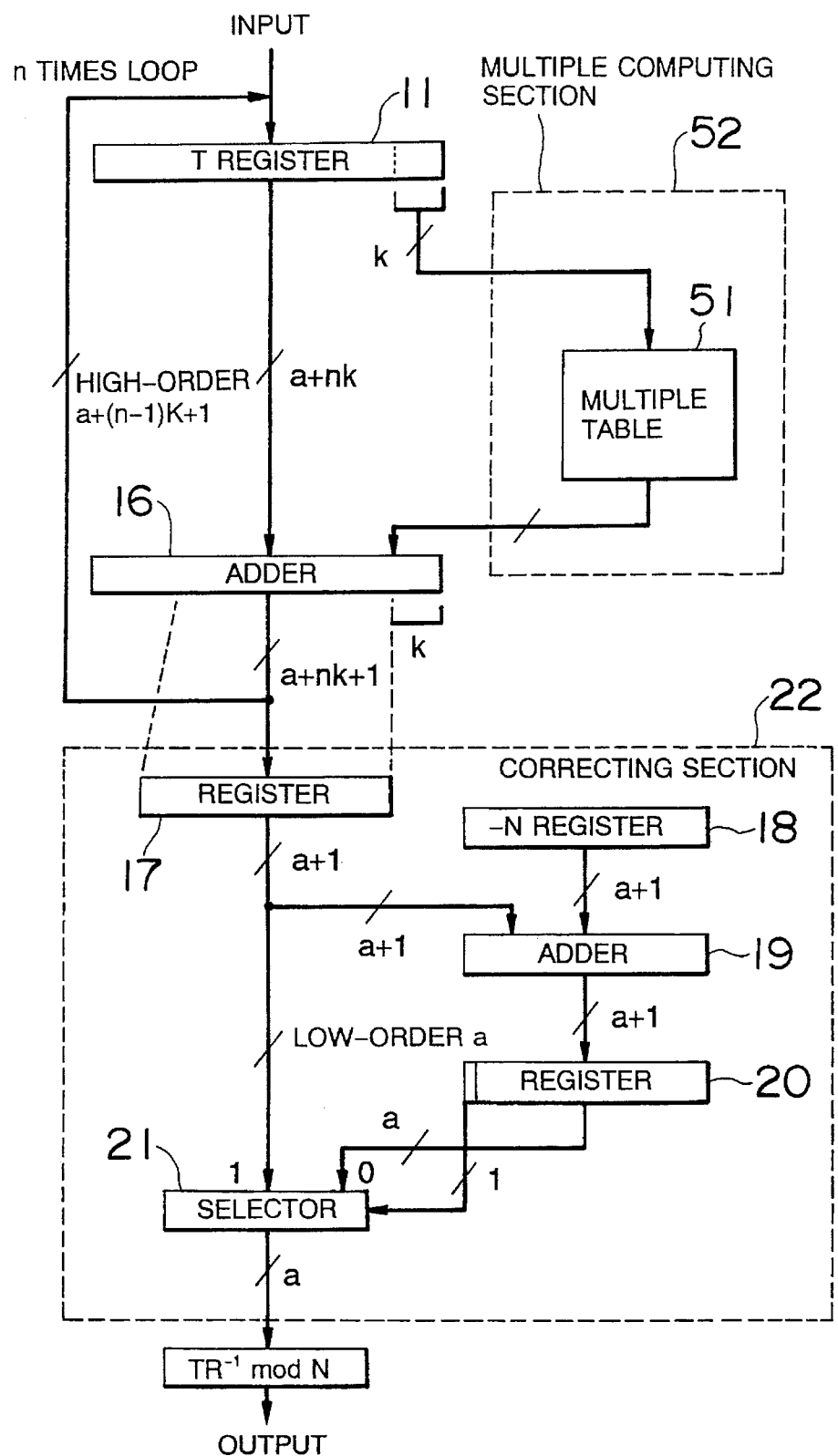
FIG. 5 is a block diagram of a modular arithmetic unit according to a third embodiment of the present invention.

Like the arithmetic unit of FIG. 3, the multiple-table-based modular arithmetic unit shown in FIG. 5 has T register 11, first adder 16, and correcting section 22. This modular arithmetic unit of FIG. 5 is provided with a multiple computing section 52 in the form of a multiple table 51, which is a replacement for the multiple computing section 32 in FIG. 1.

The multiple table 51 of the multiple computing section 52 stores multiples m'N of modulo N for low-order some bits of T. That is, the multiple table 51 is constructed to incorporate all the functions of the multiple information table 41, N register 12 and first multiplier 14 of FIG. 3. The lower-order 8 bits of the T register 11 are used to retrieve a piece of 520-bit multiple information from the table 51. This multiple table 51 is set up as a table of 520 bits in width and 256 entries in depth in accordance with a multiple table setup method as used in a table setup device of a fourth embodiment which will be described later.

As with the second embodiment, when T is entered into the T register 11, its low-order 8 bits are used to refer to the multiple table 51 of the multiple computing section 52. As a result, a value is retrieved from the table 51 and it is then added to the value in the T register 11 in the first adder 16.

The process after the addition in the first adder 16 is the same as that in the second embodiment described above.

According to the modular arithmetic unit shown in FIG. 5, the computation of multiples is performed by means of table lookup of the multiple table 51 in the multiple computing section 52, which allows multiples to be computed still faster.

<Embodiment 4>

The table setup device according to a fourth embodiment of the present invention is adapted to set up the multiple table for use in the modular arithmetic unit shown in FIG. 5 according to the third embodiment, which can facilitate the setup of a multiple table.

Using the nature of the Montgomery's algorithm that addition of a multiple of modulo N to an input value T results in its low-order k bits becoming zeros, the table setup device according to the fourth embodiment of the present invention sets up a table without using the parameter N' directly. An arrangement of such a table setup device and a configuration of a multiple table are illustrated schematically in FIG. 6.

Figure 6:
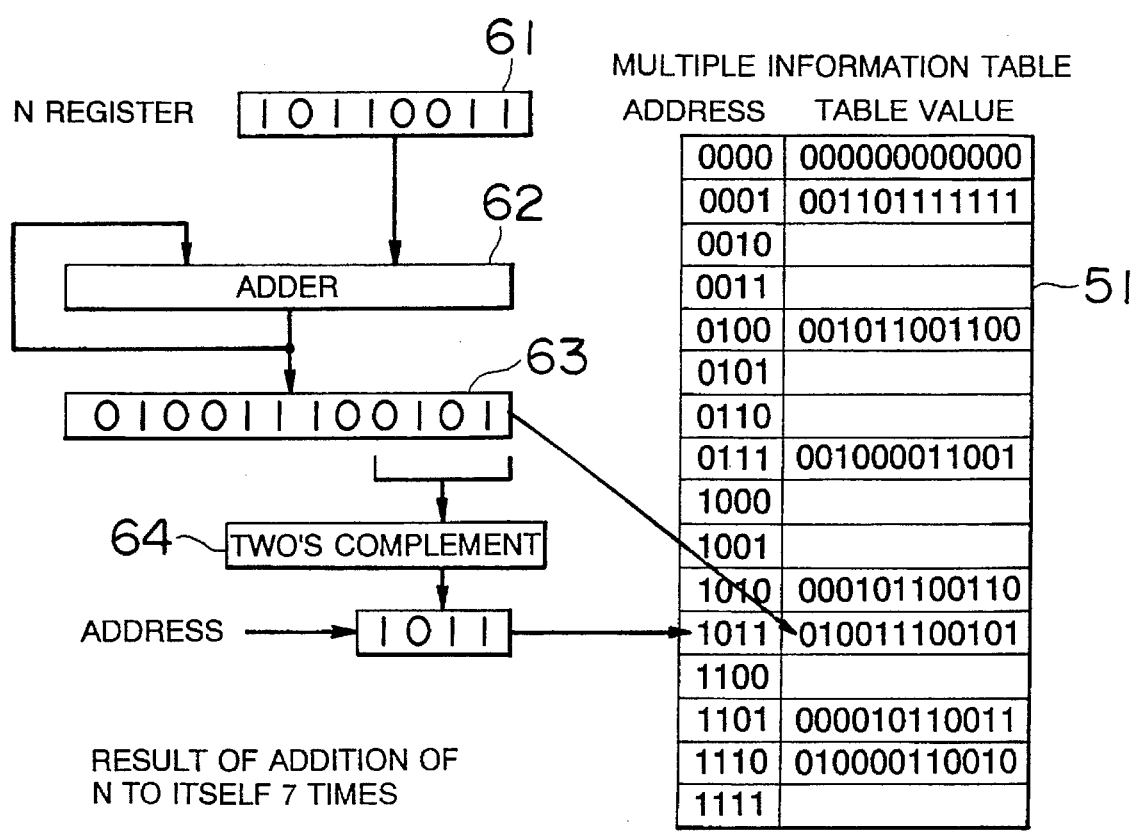
FIG. 6 is a schematic illustration of a table setup device according to a second embodiment of the present invention for setting up the table of multiples used in the modular arithmetic unit of FIG. 5.

The table setup device of FIG. 6 comprises an N register 61, an adder 62, a register 63 in which the result of addition is placed, and a complementary operation section 64. The N register 61 holds modulo N. The modulo N is added to itself repeatedly by the adder 62. The result of each addition is placed in the register 63. The complementary operation section 64 obtains the two's complement of the low-order some bits of the sum placed in the register 63. Using each value obtained by the complementary operation section 64 as a table address, the sum placed in the register 63 at each addition is sequentially written into a table, whereby a multiple table 51 is created.

It is here supposed for convenience of description that the modulo N is $10110011_2$ and table lookup is performed by using four bits. In FIG. 6, 0 is first loaded into address 0 of the table. Next, the modulo N in the N register 61 is added to 0 in the adder 62 and the sum, $10110011_2$ is then placed in the register 63. The low-order four bits, $0011_2$, of the sum is entered into the complementary operation section 64, so that the two's complement, $1101_2$, of $0011_2$ is obtained. As a result, $10110011_2$ is loaded into address $1101_2$ of the table. In this way, the result of each addition is loaded sequentially into a corresponding table address indicated by the two's complement of the low-order four bits of that result.

For example, in the state shown in FIG. 6, N is added to $10000110010_2$, the result after the addition was performed six times, to yield $10011100101_2$ and the two's complement of $0101_2$ is obtained as $1011_2$. $10011100101_2$ is loaded into table address $1011_2$.

Such an operation is repeated 16 times to complete the multiple table 51.

The writing of the result of each addition into the corresponding table address is performed by a table writing section not shown.

The table setup device of the present embodiment is based on the nature of the Montgomery's algorithm that, when a multiple of the modulo N is added to an input value T, the low-order k bits become 0s. This permits a multiple table to be set up easily without the direct use of the parameter N' that involves complex computations.

The table setup device merely needs processes of performing simple reiterative arithmetic operations of addition, obtaining two's complements, and writing into a table. Therefore, the device can be implemented easily by software on a work station, a personal computer, etc., as well as by a hardware configuration corresponding to that of FIG. 6.

<Embodiment 5>

Figure 7:
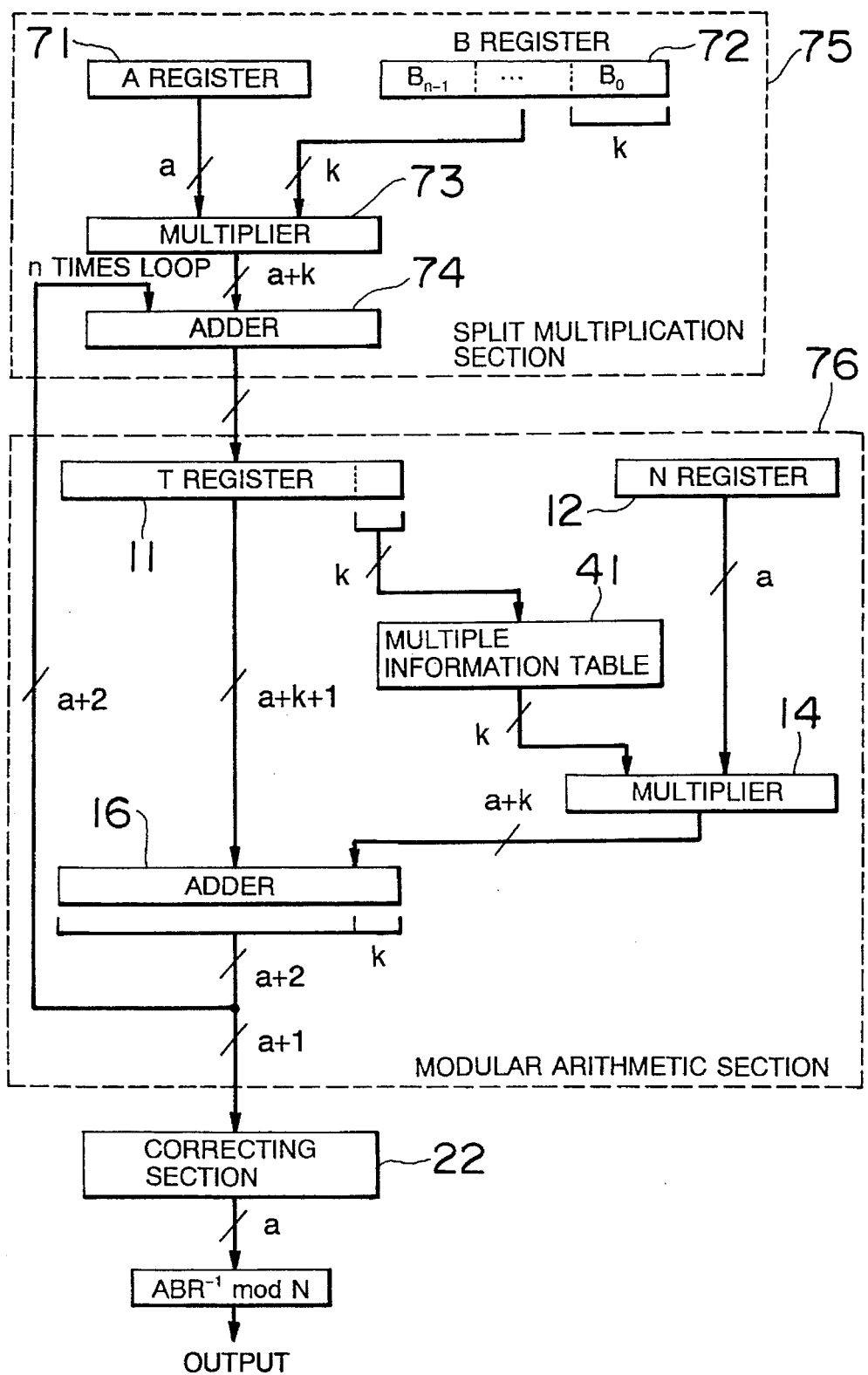
FIG. 7 is a block diagram of a modular multiplication arithmetic unit according to a fifth embodiment of the present invention.

A modular multiplication arithmetic unit according to a fifth embodiment of the present invention uses the arrangement of the multiple-table-based modular arithmetic unit shown in FIG. 3 and the arrangement of a split multiplication unit in combination. FIG. 7 is a block diagram of the modular multiplication arithmetic unit according to the fifth embodiment of the present invention, in which like reference numerals are used to denote corresponding parts to those in FIG. 3.

The modular multiplication arithmetic unit of FIG. 7 is adapted to perform a process of AB→ABR$^{-1}$ mod N with R=b$^n$ and b=2$^k$ and includes T register 11, N register 12, first multiplier 14, first adder 16, correcting section 22, and multiple information table 41. The modular multiplication unit is further provided with an A register 71, a B register 72, a third multiplier 73, and a third adder 74.

The A register 71, the B register 72, the third multiplier 73 and the third adder 74 constitute a split multiplier 75, while the T register 11, the N register 12, the first multiplier 14, the first adder 16 and the multiple information table 41 constitute a modular arithmetic unit 76.

The A register 71 holds a given multiplier A, while the B register 72 holds a given multiplicand B. The multiplicand B in the B register 72 is split into bit blocks each of k bits and these bit blocks are sequentially taken from the B register 72 in the order B0(low-order side), B1, . . . , Bn−1(high-order side). The multiplier 73 multiplies each block of k bits from the B register and the multiplier A in the A register 71. The adder 74 adds the value in the adder 16 of the modular arithmetic unit 76 to the result of multiplication by the multiplier 73 until the loopback for repeated addition is performed n times.

In this case, as opposed to the arrangement of FIG. 3, the sum in the adder 16 in the modular arithmetic unit 76 is looped back to the adder 74 in the modular multiplication arithmetic unit 75 as it is.

Here, the modular multiplication arithmetic unit of the present invention will be described using specific numbers of bits. The modular multiplication arithmetic unit of FIG. 7 is constructed as a multiple-information-table-based modular multiplication arithmetic unit in which the A and B registers 71 and 72 each of 512 bits wide, the multiplier 73 of 520 bits wide, and the adder 74 of 521 bits wide are incorporated into the T register 11 and its associated loop for addition in FIG. 3.

In order to implement a modular multiplication arithmetic unit by using the modular arithmetic unit of FIG. 3 as it is, an additional multiplier would be required. In this case, the result of multiplication by this multiplier has only to be substituted into the T register 11. In the case of the present embodiment, however, the combination of the modular arithmetic unit with the split multiplication unit permits the bit width of each of the T register 11, the adder 16 and its associated addition loop to be reduced.

When two numbers for modular arithmetic, i.e., a multiplier and a multiplicand, are entered into the A and B registers 71 and 72, respectively, the multiplier in the A register 71 and one of blocks of 8 successive bits in the multiplicand in the B register 72 are multiplied in the multiplier 73. Note here that, as described above, each of 8-bit blocks in the multiplicand is sequentially taken from the B register 72 in the order B0 (low-order side), B1, . . . , Bn−1 (high-order side). The result of the multiplication in the multiplier 73 and the last calculated value (initially 0) of the addition loop are added together in the adder 74. The sum in the adder 74 is entered into the T register 11. The subsequent process to the adder 16 is the same as that in the embodiment of FIG. 3. If the number of times (n) the sum has been looped from the adder 16 back to the adder 74 is less than 64, then the high-order 514 bits of the sum in the adder 16 are fed back to the adder 74 via the addition loop and then added to the next result of the split multiplication of the A and B registers 71 and 72. When the addition loopback is executed 64 times, 513 bits beginning at the low-order ninth bit are taken from the value in the adder 16 and entered into the correcting section 22. Thus, 512-bit ABR$^{-1}$ mod N is output from the correcting section 22.

<Embodiment 6>

Figure 8:
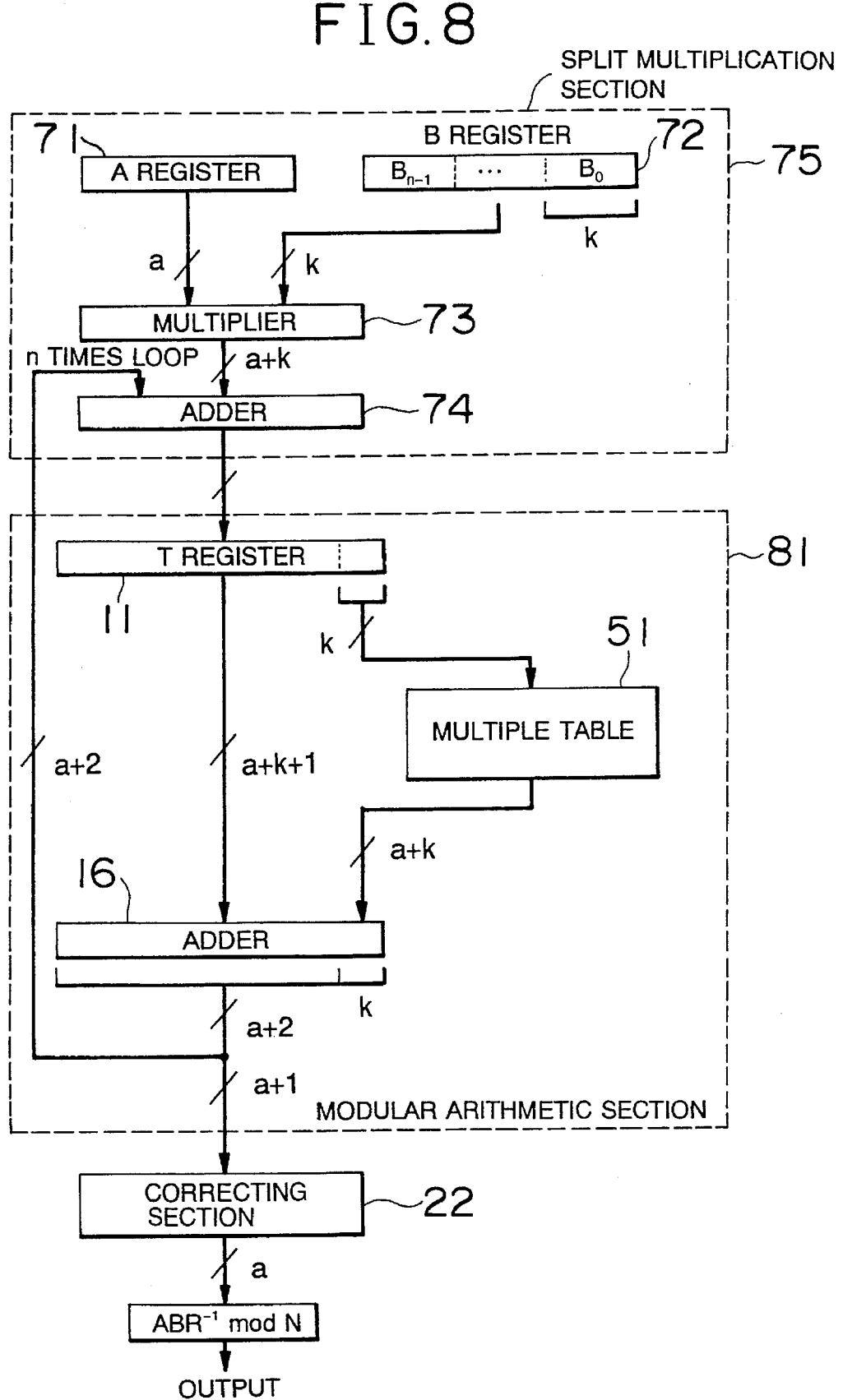
FIG. 8 is a block diagram of a modular multiplication arithmetic unit according to a sixth embodiment of the present invention.

A modular multiplication arithmetic unit according to a sixth embodiment of the present invention combines a modular arithmetic unit using a multiple table as shown in FIG. 5 and a split multiplication unit as shown in FIG. 7. FIG. 8 is a block diagram of the modular multiplication arithmetic unit according to the sixth embodiment, in which like reference numerals are used to denote corresponding parts to those in FIG. 5 and FIG. 7.

The modular multiplication arithmetic unit shown in FIG. 8 comprises T register 11, first adder 16, correcting section 22, and multiple table 51, which are all shown in FIG. 5, and A register 71, B register 72, third multiplier 73, and third adder 74, which are all shown in FIG. 7.

The A register 71, the B register 72, the third multiplier 73 and the third adder 74 constitute split multiplication unit 75, while the T register 11, the first adder 16 and the multiple table 51 constitute modular arithmetic unit 81.

As in the case of FIG. 7, the A register 71 holds a given multiplier A, while the B register 72 holds a given multiplicand B. The multiplier 73 takes each block of k bits from the multiplicand in the B register 72 in sequence from its low-order side and multiplies it by the multiplier A in the A register 71. The adder 74 adds the sum in the adder 16 in the modular arithmetic unit 81 to the value in the multiplier 73 until the addition loopback is executed n times. The sum in the adder 16 is fed back to the adder 74 as it is.

The modular arithmetic unit and the modular multiplication arithmetic unit of the present invention can be implemented by hardware. At least part of functions performed by hardware may be implemented by software. In such a case as well, processing speed could be increased.

The modular arithmetic unit and the modular multiplication arithmetic unit of the present invention perform multiplications for computation of multiples in the modular arithmetic according to the Montgomery's algorithm by means of table lookup, which allows processing to be simplified and modular arithmetic and modular multiplication arithmetic to be speeded up.

For comparison of the modular arithmetic part when the modular arithmetic unit or the modular multiplication arithmetic unit of the invention is implemented by software, assume that the processing time when no table is used is 100. Then, the processing time is 98 when a multiple information table is used and 31 when a multiple table is used. Accordingly, it will be appreciated that the modular arithmetic unit or the modular multiplication arithmetic unit of the present invention produces a significant improvement in the speed of performing modular arithmetic.

In addition, if a multiple table used in the multiple-table-based system is set up by the table setup device of the present invention, it can be set up without the need of obtaining a parameter N' involving complex computations merely by adding modulo N to itself repeatedly, obtaining the two's complement of the low-order some bits of each sum, and storing the sum in the address corresponding to the two's complement.

It is apparent that, in this invention, a wide range of different working modes can be formed based on the invention without deviating from the spirit and scope of the invention.

What is claimed is:

1. A modular arithmetic unit comprising:

an input register for holding an input number;

multiple computing means for obtaining a multiple of a modulus corresponding to a low-order predetermined bits of said input number in said input register by table lookup using a table in which arithmetic data have been stored in advance on the basis of said low-order predetermined bits of said input number;

adder means for performing addition of said multiple of said modulus obtained by said multiple computing means and the contents of said input register and updating the contents of said input register with high-order predetermined bits of the result of said addition for each addition until said addition is performed a predetermined number of times; and correcting means for making a correction on the result of addition by said adder means.

2. The arithmetic unit according to claim 1, in which said multiple computing means has a multiple table in which multiples of said modulus are stored to correspond with said low-order predetermined bits of said input number, said low-order predetermined bits of said input number being used to directly retrieve a corresponding multiple of said modulus from said multiple table.

3. The arithmetic unit according to claim 1, in which said multiple computing means comprises multiple information computing means for using said low-order predetermined bits of said input number to retrieve the corresponding multiple information from a multiple information table in which multiple information is stored to correspond to low-order predetermined bits of said input number, a modulo register for storing a modulus, and a multiplier means for multiplying said multiple information obtained by said multiple information computing means and said modulus from said modulo register, thereby obtaining a multiple of said modulus corresponding to said low-order predetermined bits of said input number.

4. A table setup device comprising:

repeated addition means for adding a modulus to itself repeatedly;

complement computing means for computing the two's complement of low-order k bits of each sum obtained by said repeated addition means; and table writing means for writing each sum into a table address corresponding the two's complement of that sum obtained by said complement computing means, thereby setting up on a storage device a multiple table in which multiples of said modulus are stored to correspond with low-order predetermined bits of an input number.

5. The device according to claim 4, in which said multiple table is used in multiple computing means of a modular arithmetic unit comprising: an input register for holding an input number; multiple computing means for obtaining a multiple of said modulus corresponding to said low-order predetermined bits of said input number in said input register by having a multiple table in which multiples of said modulus are stored to correspond with said low-order predetermined bits of said input number and using said low-order predetermined bits of said input number to directly retrieve its corresponding multiple of said modulus from said multiple table; adder means for performing addition of said multiple of said modulus obtained by said multiple computing means and the contents of said input register and updating the contents of said input register with high-order predetermined bits of the result of said addition for each addition until said addition is performed a predetermined number of times; and correcting means for making a correction on the result of addition by said adder means.

6. A modular multiplication arithmetic unit comprising:

a split multiplication section for multiplying a multiplier and each of blocks of a predetermined number of bits in a multiplicand and adding a residue to the result of multiplication, said block being taken from said multiplicand in sequence from its low-order side;

an input register for holding an input number output from said split multiplication section;

multiple computing means for obtaining a multiple of a modulus corresponding to a low-order predetermined bits of said input number in said input register by table lookup using a table in which arithmetic data has been stored in advance on the basis of said low-order predetermined bits of said input number;

adder means for performing addition of said multiple of said modulus obtained by said multiple computing means and the contents of said input register, the result of said addition being applied to said split multiplication section as said residue for each addition until said addition is performed a predetermined number of times; and correcting means for making a correction on the result of addition by said adder means.

7. The arithmetic unit according to claim 6, in which said multiple computing means has a multiple table in which multiples of said modulus are stored to correspond with said low-order predetermined bits of said input number, said low-order predetermined bits of said input number being used to directly retrieve a corresponding multiple of said modulus from said multiple table.

8. The arithmetic unit according to claim 6, in which said multiple computing means comprises multiple information computing means for using said low-order predetermined bits of said input number to retrieve the corresponding multiple information from a multiple information table in which multiple information is stored to correspond to low-order predetermined bits of said input number, a modulo register for storing a modulus, and a multiplier means for multiplying said multiple information obtained by said multiple information computing means and said modulus from said modulo register, thereby obtaining a multiple of said modulus corresponding to said low-order predetermined bits of said input number.

9. A modular arithmetic unit for computing $TR^{-1}$ mod $N$=REDC(T) to obtain T mod N=REDC(T*($R^2$ mod N)), the residue of the division of integer T by integer N, comprising:

an input register for holding an input number T;

multiple computing means for obtaining a multiple m'N (where m'=(T mod b) N' mod b, N'=integer, R (integer)=$b^n$, b=$2^k$) of a modulo N corresponding to a low-order predetermined bits of said input number T in said input register by table lookup using a table in which arithmetic data have been stored in advance on the basis of said low-order predetermined bits of said input number;

adder means for performing addition of said multiple m'N of said modulo N obtained by said multiple computing means and the contents of said input register and updating the contents of said input register with high-order predetermined bits of the result of said addition for each addition until said addition is performed a predetermined number of times, thereby outputting t=(T+mN)/R; and correcting means for making a correction on the result t of addition by said adder means such that if t<N, t=REDC(T), and if t≧N, t−N=REDC(T), thereby obtaining $TR^{-1}$ mod N.

10. The arithmetic unit according to claim 9, in which said multiple computing means has a multiple table in which multiples m'N of said modulo N are stored to correspond with said low-order predetermined bits of said input number T, said low-order predetermined bits of said input number T being used to directly retrieve a corresponding multiple m'N of said modulo N from said multiple table.

11. The arithmetic unit according to claim 9, in which said multiple computing means comprises multiple information computing means for using said low-order predetermined bits of said input number to retrieve the corresponding multiple information m' from a multiple information table in which multiple information is stored to correspond to low-order predetermined bits of said input number, a modulo register for storing a modulo N, and a multiplier means for multiplying said multiple information m' obtained by said multiple information computing means and said modulo N from said modulo register, thereby obtaining a multiple m'N of said modulo N corresponding to said low-order predetermined bits of said input number.

* * * * *